United States Patent [19]

West

[11] Patent Number: 4,888,656
[45] Date of Patent: Dec. 19, 1989

[54] PIVOT MECHANISM FOR ROTARY DISC DRIVES

[75] Inventor: Terence H. West, Aptos, Calif.

[73] Assignee: Seagate Technology, Inc., Scotts Valley, Calif.

[21] Appl. No.: 220,232

[22] Filed: Jul. 18, 1988

[51] Int. Cl.[4] .............................................. G11B 5/55
[52] U.S. Cl. .................................................... 360/106
[58] Field of Search .......................................... 360/106

[56] References Cited

U.S. PATENT DOCUMENTS

| | | | |
|---|---|---|---|
| 4,249,221 | 2/1981 | Cox | 360/97.02 |
| 4,713,703 | 12/1987 | Asano | 360/106 X |
| 4,754,353 | 6/1988 | Levy | 360/106 |

*Primary Examiner*—A. J. Heinz
*Attorney, Agent, or Firm*—Flehr, Hohbach, Test, Albritton & Herbert

[57] ABSTRACT

An improved pivot mechanism for a disc drive system incorporating a rotary actuator. The disc drive system has a head positioning apparatus located within a housing for positioning a plurality of read/write heads relative to a recording media located within the housing. The head positioner assembly includes a pivot housing that is journaled about a pivot mechanism to rotatably coupled the head positioning assembly to the disc drive housing. The pivot mechanism includes a fixed pivot shaft that is supported by the drive housing on both ends and a pair of spaced apart bearings having outer races that are bonded to the pivot housing. The inner bearing races are bonded to the fixed shaft. The outer bearig races are adhesively bonded to the pivot housing under a predetermined preload maintained by a spacer and a pair of Belleville washers that push outward on the outer race during bonding. The pivot shaft and the pivot housing are both fabricated from the same material to minimize preloading variation during adhesive bonding of the outer races. The pivot shaft maintains a constant diameter between the bearings to maximize stiffness.

4 Claims, 4 Drawing Sheets

PIVOT MECHANISM FOR ROTARY DISC DRIVES

The present invention relates generally to the field of disc drives incorporating rotary actuators. More particularly, the invention relates to an improved pivot mechanism for a rotational head positioner assembly.

BACKGROUND OF THE INVENTION

Disc drive machines record and reproduce information on a recording media. The media generally takes the form of circular information storage discs having a multiplicity of concentric tracks. Conventional Winchester type disc drives include a plurality of vertically aligned rotating information storage discs, each having at least one associated magnetic head that is adapted to transfer information between the disc and an external system. Each head is carried by an elongated flexure arm. The flexure arms are vertically aligned and are each attached to a common head positioner assembly. The head positioner assembly may be either rotationally mounted, or may take the form of a linear carriage that is free to move back and forth along a single axis. In rotary mounted head positioner assemblies, a voice coil motor rotates the head positioner assembly about a pivot mechanism to precisely position the heads relative to the magnetic discs.

Due to the precise positioning requirements of the read/write heads, the head positioner assembly must be finely balanced and the pivot mechanism must offer high precision and reliability, together with low mechanical resistance, in order to minimize undesirable vibrations within the drive. New drives constantly push for higher access speed and more memory storage within a confined space. In high speed compact disc drives, such as the 3½ inch drives now becoming popular, if any of the drive's components have primary resonant frequencies under approximately 5 Khz, mechanical movement within the drive will occasionally excite the resonant frequencies during normal operation which can limit the drives performance and/or generate undesirable noise which gives the appearance of an inferior quality product.

The pivot mechanism typically includes a pair of bearings that must be preloaded to properly balance the assembly. One problem frequently encountered in manufacturing is maintaining consistent preloads even over wide thermal variations.

SUMMARY OF THE INVENTION

Accordingly, it is an objective of the present invention to meet these design requirements utilizing a pivot mechanism that has a low part count, is easy to assembly at low costs.

Another objective of the invention is to provide a pivot mechanism that does not have any parts that have primary resonant frequencies under 5 Khz.

To achieve the foregoing and other objects and in accordance with the purpose of the present invention, an improved pivot mechanism is provided for use in a disc drive system incorporating a rotary actuator. The disc drive system has a head positioning apparatus located within a housing for positioning a plurality of read/write heads relative to recording media within the housing. The head positioner assembly includes a pivot housing that is journaled about a pivot mechanism to rotatably coupled the head positioning assembly to the disc drive housing.

The improved pivot mechanism includes a fixed pivot shaft that is supported by the drive housing on both ends and a pair of spaced apart bearings having outer races that are bonded to the pivot housing. The inner bearing races are bonded to the pivot shaft. The outer bearing races are adhesively bonded to the pivot housing under a predetermined preload established by a spacer and a pair of Belleville washers that push outward on the outer race during bonding. The pivot shaft and the pivot housing are both fabricated from aluminum to minimize preloading variation during thermal cycling of the disc drive. The pivot shaft maintains a constant diameter between the bearings to maximize stiffness.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
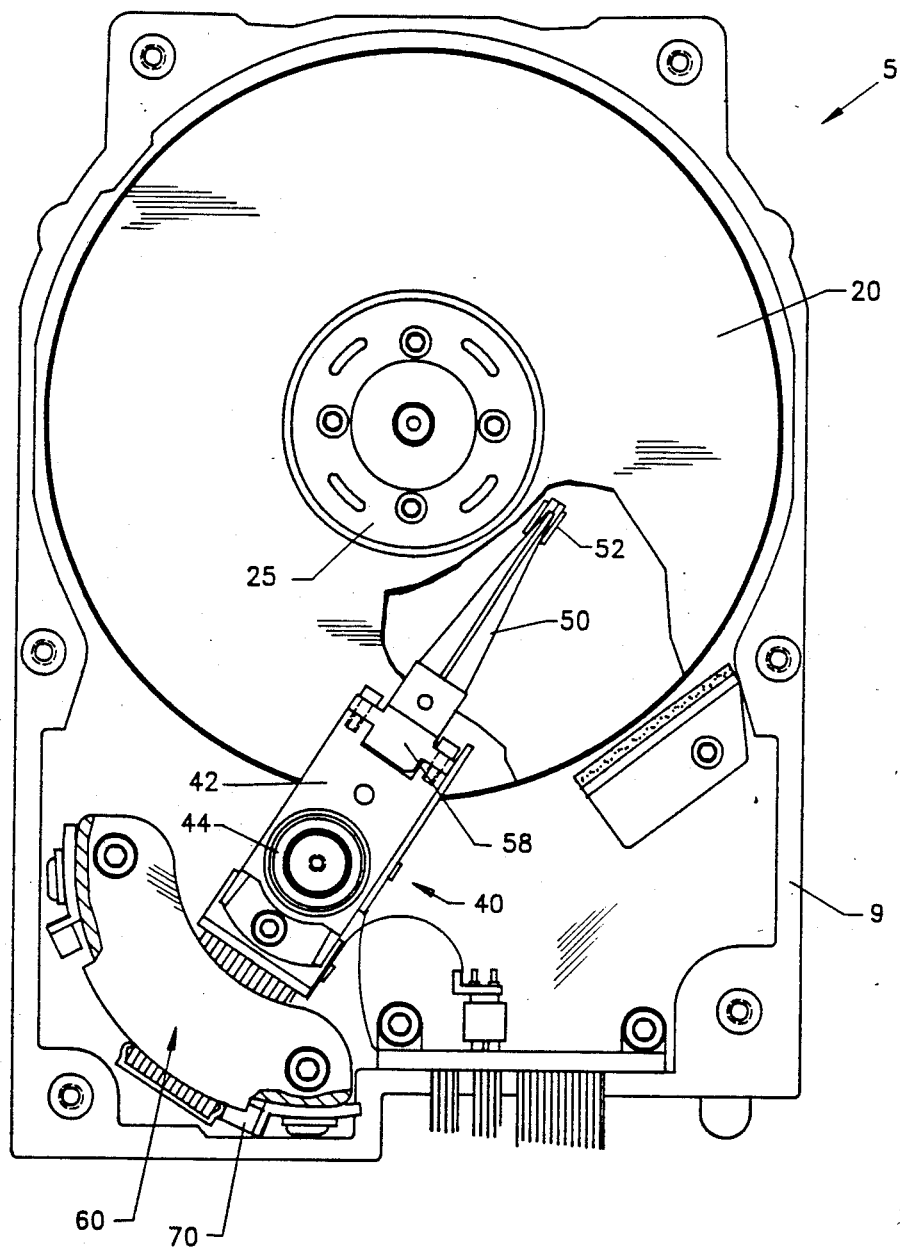
FIG. 1 is a top view of a disc drive that incorporates the present invention with its upper casing removed.
Figure 2:
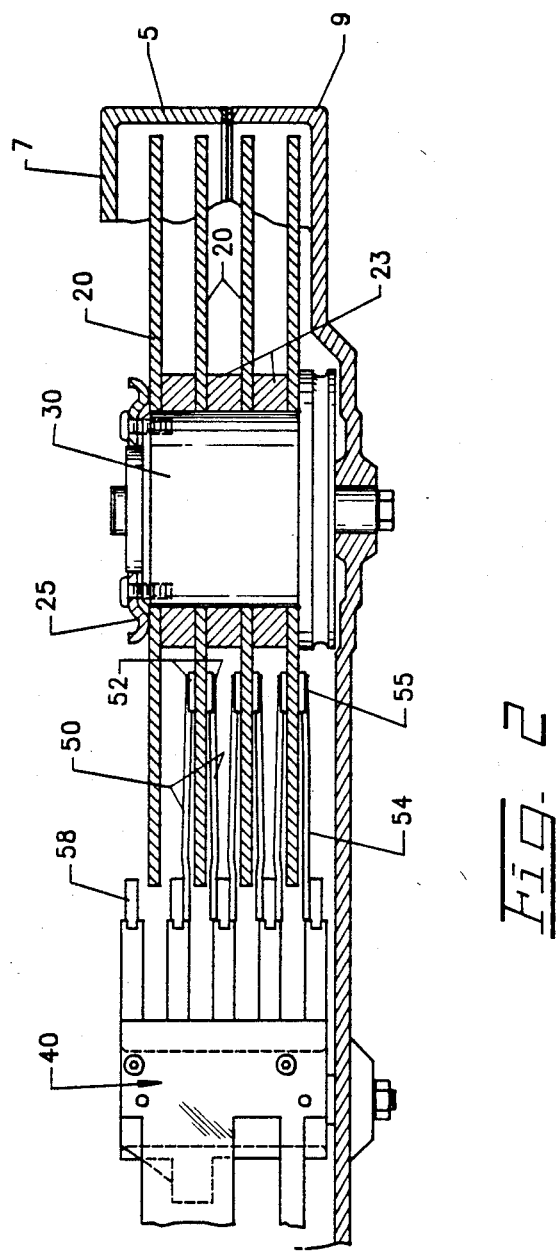
FIG. 2 is a side view of the disc drive shown in FIG. 1.

Referring first to FIGS. 1 & 2, a rotary disc drive system suitable for incorporating the teaching of the present invention is shown in diagrammatic form. A plurality of magnetic information storage discs 20 are journaled about a spindle motor assembly 30 within a housing 5 having upper and lower casing members 7 & 9 respectively. Each magnetic disc 20 has a multiplicity of concentric circular information storage tracks for recording information. Spacers 23 are disposed between adjacent information storage discs 20 to maintain their spacing and a disc clamp 25 positioned above the top information storage disc firmly secures the magnetic discs to the spindle motor assembly 30.

A head positioner assembly 40 includes an E shaped pivot housing 42 that is rotationally coupled between the upper and lower casings 7,9 in one corner of the housing 5 by pivot mechanism 44. The head positioner assembly 40 carries a plurality of head arm flexures 50 that each carry a magnetic read/write head 52 for reading information from and writing information onto the magnetic discs 20. The head positioner assembly 40 also carries a servo arm 54 which carries a servo head 55 for accurately positioning the magnetic heads 52 relative to the information storage tracks. The head and servo arms are each attached to the head positioner assembly 40 by individual flexure mounts 58. A voice coil motor 60 is adapted to precisely rotate the head positioner assembly back and forth such that the heads 52, 55 move in unison across the discs 20. A magnetic latch 70 holds the head positioner assembly in place when the disc drive is not in use.

The rotational movements of the head positioner assembly 40 are limited by bumper stops 80 which are disposed directly behind the voice coil motor 60. Electrical communications between the disc controller and the voice coil motor 60 are made over a drive printed circuit cable 90. Communications between the various heads 52,55 and the system controller are made over read/write printed circuit cable 95.

Figure 3:
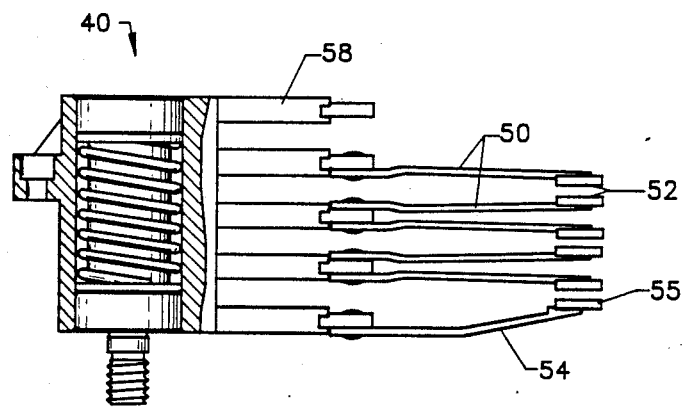
FIG. 3 is a perspective view of a head positioner assembly incorporating the pivot mechanism of the present invention.

Referring next to FIG. 3, the head positioner assembly 40 includes a pivot housing 42 that is journaled about pivot mechanism 44. The pivot housing is somewhat E shaped and has a plurality of forwardly extending vertically aligned platforms 82 that each form a mounting base for a single flexure mount 58. The coil 64 for voice coil motor 60 is attached to the back side of the pivot housing 42 by a single centered screw attachment. To minimize weight at a reasonable cost, the pivot housing 42 is fabricated from aluminum. As can be appreciated by reference to FIG. 1, in the preferred embodiment, the pivot housing 42 as well as almost everything it carries are symmetrical about its longitudinal axis. The symmetry is desirable to precisely balance the head positioning assembly, which reduces undesirable internal vibrations.

Figure 4:
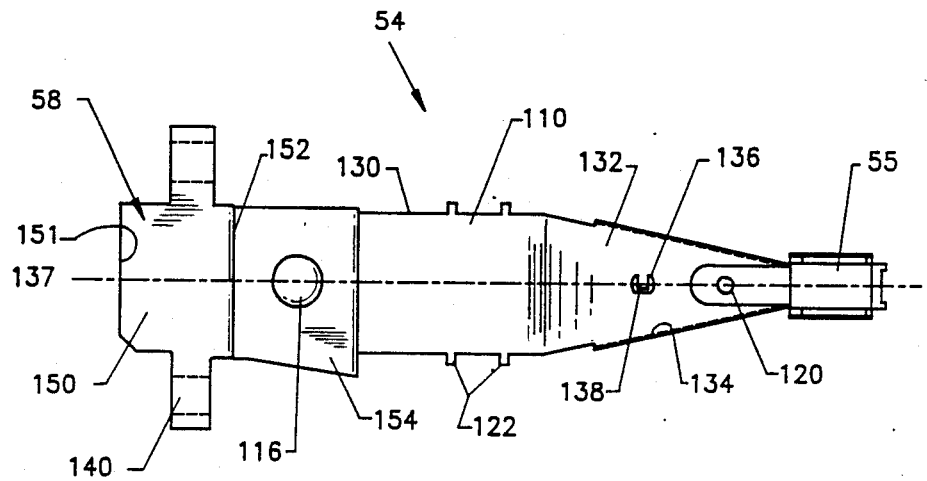
FIG. 4 is a cut away side view of the pivot mechanism of the present invention.
Figure 5:
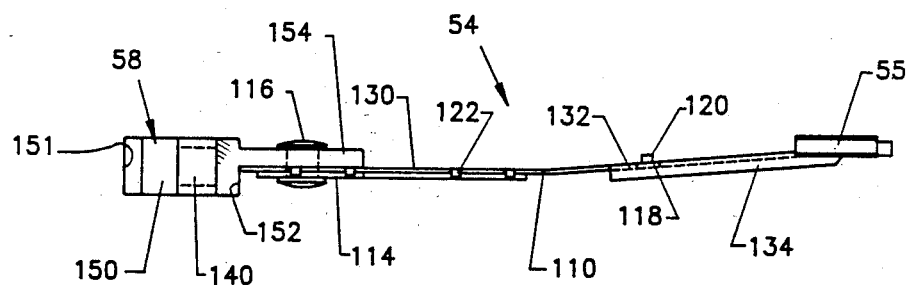
FIG. 5 is an exploded perspective view of the pivot mechanism shown in FIG. 4.

Referring next to FIGS. 4 and 5, the pivot mechanism of the present invention includes a fixed pivot shaft 100 and a pair of ball bearings 102,103 that are journaled about the pivot shaft in spaced apart relation. A tubular spacer 105 and Belleville washers 107 are disposed between the spaced apart ball bearings 102,103, however they serve only to provide proper spacing and preload during assembly and serve no substantial purpose once the pivot mechanism has been assembled.

The pivot shaft 100 has a threaded lower end that forms a clamp screw 110 and a relatively small diameter screwhole 112 on its upper surface. The shaft is formed from aluminum as opposed to stainless steel which is typically used for the pivot mechanism shaft. An aluminum shaft is particularly advantageous since it allows the pivot housing 42 and the pivot shaft 100 to be fabricated from the same material which significantly reduces thermally induced bearing preload variations within the pivot mechanism. The pivot shaft 100 has a constant diameter in the region between the bearings 102 and 103 to provide maximum stiffness. During assembly, the threaded portion 110 on pivot shaft 100 is received by an appropriate hole in the lower casing 9 and fixed by a nut. When the disc drive is finally assembled, a screw, (not shown) is threaded through the upper casing 7 into screwhole 112 to support the pivot shaft 100 at both ends. This duel end support provides maximum stiffness for the pivot mechanism with minimum structure. The shaft diameter is designed to provide the support necessary to hold the pivot housing under all design conditions and to eliminate any primary resonances under 5 Khz.

To assemble the pivot mechanism, which includes the assembled pivot shaft 100, bearings 102, 103, spacer 105 and Belleville washers 107, is fixed to the bottom casing 9 of disc housing 5 by a nut. The outer races 120 of bearing 102, 103 are bonded to the pivot housing using a suitable adhesive such as Loctite. While the adhesive cures, the Belleville washers push outward on the outer races 120 to provide the desired hard preload. By way of example in a 3½ inch drive using an aluminum shaft as described, a suitable preload would be in the range of 4±0.4 lbs. The Belleville washers 107 are utilized to provide consistency in the applied preload without requiring delicate application of a load. The spacer and belleview washers arrangement described is used in place of a coil spring as used in some bearing assemblies because suitably sized coil springs tend to have resonant frequencies below 5 Khz.

A major advantage of the pivot mechanism construction described above is that the parts involved are extremely simple in terms of geometry and fabrication, making the present invention especially suitable for high volume production. Although only one embodiment of the present invention has been described herein, it should be understood that the present invention may be embodied in other specific forms without departing from the spirit or scope of the invention. Therefore, the present examples and embodiments are to be considered as illustrative and not restrictive, and the invention is not to be limited to the details given herein, but may be modified within the scope of the appended claims.

I claim:

1. A rotary actuator for a disc drive system having a head positioning assembly for positioning a plurality of transducer heads relative to a recording media located within a disc housing, the head positioner assembly including a pivot housing that carries the transducer heads, the rotary actuator comprising a pivot mechanism that includes:
    a fixed pivot shaft that is supported by the drive housing on both ends;
    a pair of spaced apart bearings each having outer races that are adhesively bonded to the pivot housing and inner races that are adhesively bonded to the pivot shaft;
    preload means for pressing axially outwardly on the outer bearing races during adhesive bonding to the pivot housing to maintain a selected axial preload during adhesive bonding, the preload means including a spacer journaled about the pivot shaft between the spaced apart bearings and a non-coiled tension mechanism journaled about the pivot shaft adjacent the spacer for pressing against a first one of the bearings and pressing the spacer against the second bearing, the spacer having a diameter that is less than or equal to the diameter of the bearings and occupying at least 50 percent of the distance between the spaced apart bearings; and
    wherein the pivot shaft and the pivot housing are both fabricated from the same material to minimize preloading variations during adhesive bonding of the outer races and wherein the pivot shaft maintains a constant diameter between the bearings to maximize stiffness.

2. A rotary actuator as recited in claim 1 wherein said pivot housing and said pivot shaft are formed of aluminum.

3. A rotary actuator as recited in claim 1 wherein said pivot housing and said pivot shaft are a pair of Belleville washers.

4. A rotary actuator as recited in claim 1 wherein said spacer occupies at least 75 percent of the distance between the spaced apart bearings.

* * * * *